United States Patent [19]

McGuire et al.

[11] 4,449,941
[45] May 22, 1984

[54] EDUCATIONAL DEVICE FOR LEARNING GEOGRAPHICAL NAMES AND LOCATIONS

[76] Inventors: John McGuire, 2930 Joseph Ave., Sacramento, Calif. 95825; David G. Bories, 8421 Ascolano Ave., Fair Oaks, Calif. 95628

[21] Appl. No.: 462,421

[22] Filed: Jan. 31, 1983

[51] Int. Cl.³ ............................................. G09B 29/10
[52] U.S. Cl. .................................................... 434/153
[58] Field of Search ............... 434/153, 150, 151, 152, 434/286, 130, 322, 337, 338, 339, 340, 341; 273/153 R

[56] References Cited

U.S. PATENT DOCUMENTS

| | | | |
|---|---|---|---|
| 1,932,909 | 10/1933 | Pollard et al. | 434/153 |
| 2,139,860 | 12/1938 | Schwendeman | 434/338 X |
| 3,189,350 | 6/1965 | Hopkins | 273/153 R |
| 3,363,902 | 1/1968 | Jones | 434/150 X |
| 3,735,501 | 5/1973 | Ma | 434/341 |

FOREIGN PATENT DOCUMENTS

| | | | |
|---|---|---|---|
| 662133 | 4/1964 | Italy | 434/153 |
| 202529 | 8/1923 | United Kingdom | 434/153 |

*Primary Examiner*—William H. Grieb
*Attorney, Agent, or Firm*—Mark C. Jacobs

[57] ABSTRACT

An educational device for use in learning the locations and names of the various states in the United States as well as other information pertinent to each state is disclosed. The device comprises a rectangularly shaped board having a map of the United States on its front surface, a plurality of lamps mounted on the board, one lamp within the boundary of each state and preferably at the state capitol, a battery holder containing a battery, a cartridge receptacle mounted on the board and arranged to selectively connect the battery to each lamp, and a plurality of cartridges adapted to be inserted into the receptacle one at a time to electrically connect one of the lamps to the battery. Each cartridge contains printed matter pertinent to its particular state and is made of translucent material. When inserted into the receptacle, the cartridge is illuminated by a lamp mounted on the bottom of the receptacle and connected to the battery so that the printed matter can be easily read. In one embodiment the receptacle comprises a female card-edge connector having a plurality of pairs of contacts, one contact in each pair connected to the battery and the other contact connected to a different lamp. The cartridge contains a mating male card-edge connector. In another embodiment the receptacle includes a row of microswitches and the cartridges each include a differently positioned button for closing a different microswitch when it is inserted into the receptacle.

7 Claims, 6 Drawing Figures

EDUCATIONAL DEVICE FOR LEARNING GEOGRAPHICAL NAMES AND LOCATIONS

SUMMARY OF THE INVENTION

An educational device for use in learning the locations and names of the various states in the United States as well as other information pertinent to each state according to the teachings of the present invention comprises a rectangularly shaped board having a map of the United States on its front surface, a plurality of lamps mounted on the board, one lamp within the boundary of each state and preferably at the state capitol, a battery holder containing a battery, a cartridge receptacle mounted on the board and arranged to selectively connect the battery to each lamp and a plurality of cartridges, each adapted to be slidably inserted into the receptable one at a time and when inserted electrically connect one of the lamps to the battery. Each cartridge contains printed matter pertinent to its particular state.

In one embodiment of the invention the receptable comprises a female card-edge connector having a plurality of pairs of contacts, one contact in each pair being connected to the battery and the other contact in each pair being connected to a different lamp and the cartridge contains a mating male card-edge connector. In another embodiment of the invention the receptacle includes a row of microswitches and the cartidges each include a differently positioned button for closing a different microswitch when it is inserted into the receptacle. In use a cartridge is inserted into the receptacle causing the lamp at its associated state to be illuminated indicating its location.

For a better understanding of the present invention, together with other aid further objects thereof, reference is made to the following description taken in conjuction with the accompanying drawings and its scope will be pointed out in the appended claims.

BACKGROUND OF THE INVENTION

The present invention relates generally to educational devices and more particularly to an educational device for use in learning the names, locations and other pertinent information relating to the various states in the United States.

It is a principle object of this invention to provide a device for assisting a person in learning the names, locations and other pertinent information concerning the states in the United States.

It is another object of this invention to provide a device as described above which includes a lamp at each state which can be selectively illuminated.

It is still another object of this invention to provide a device as described above which includes a plurality of cartridges, one for each state, which can be selectively inserted into the map for illuminating its associated state.

It is a further object of this invention to provide a device as described which is attractive in appearence, easy and economical to manufacture and use and which stimulates interest in learning, especially with children.

BRIEF DESCRIPTION OF THE DRAWINGS

In the drawings wherein like reference numerals represent like parts.

DETAILED DESCRIPTION OF PREFERRED EMBODIMENTS

Figure 1:
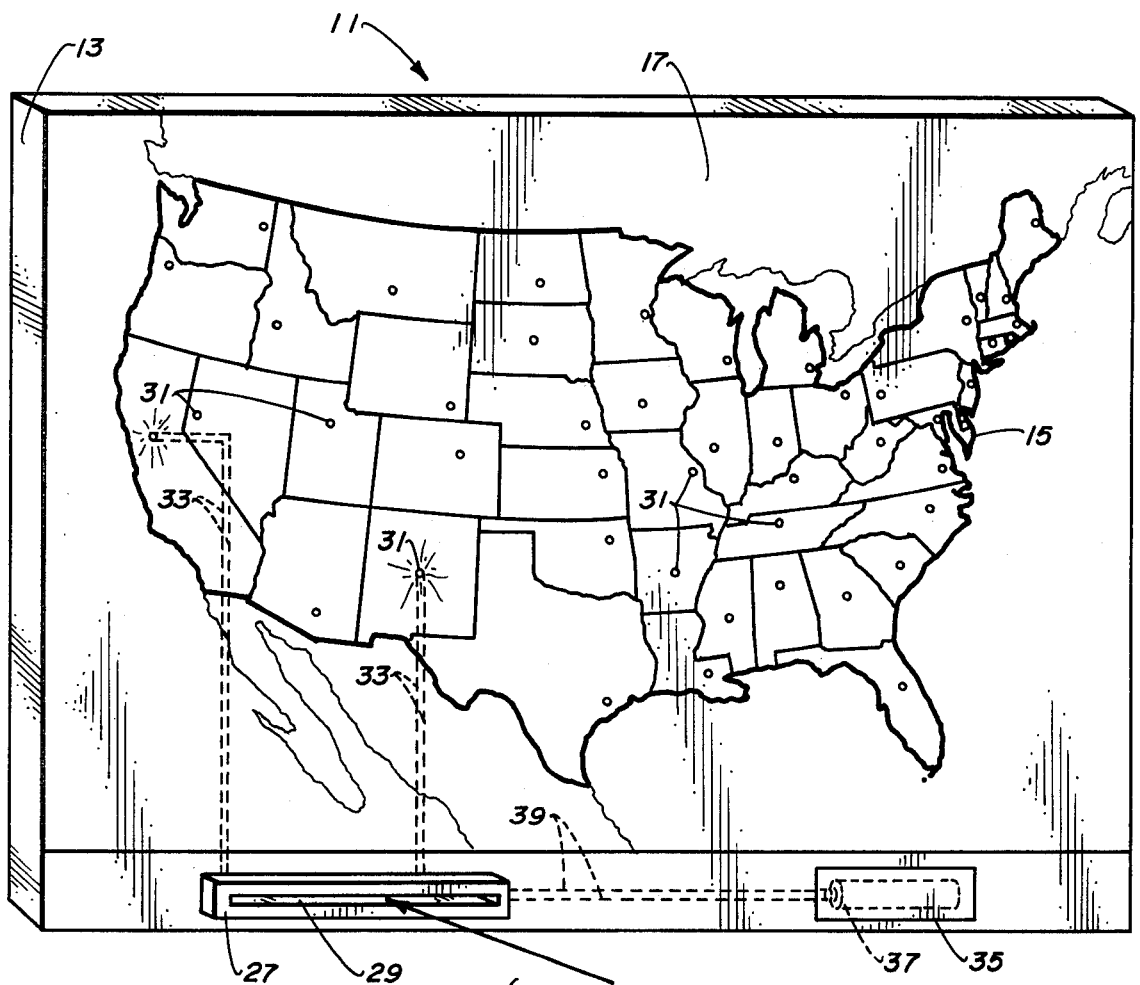
FIG. 1 is a front perspective view, of a educational device constructed according to the teachings of the present invention.

Referring now to the drawings, there is illustrated in FIG. 1 a perspective view of an educational device constructed according to the teachings of the present invention and identified generally by reference numeral 11.

Figure 2:
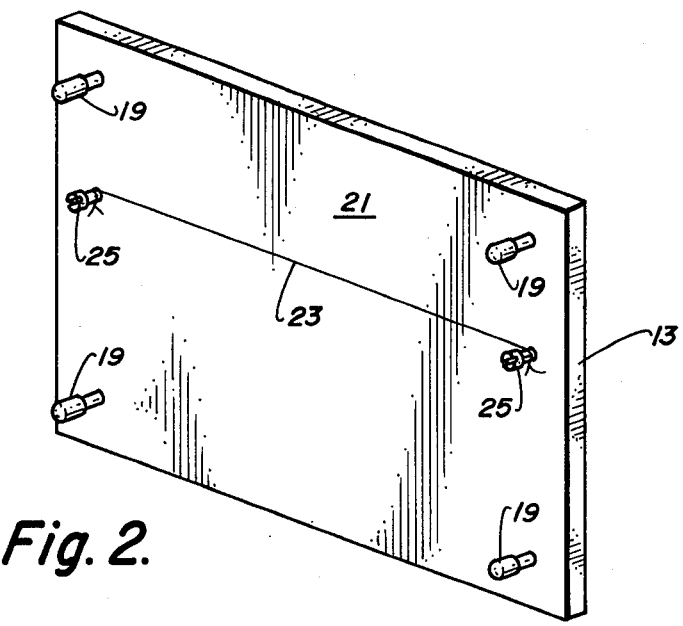
FIG. 2 is a rear perspective view of the board shown in FIG. 1.

Device 11 includes a board 13 which is perferably of a rectangular box-shaped configuration and made of any suitable sturdy material, such as cardboard, metal, wood or plastic. A map 15 of the United States is imprinted on the front 17 of board 13. A set of four mounting pads 19 are attached to the rear 21 of board 13 (as shown in FIG. 2) by screws or glue (not shown) so that the board may appropriately rest on a table or other surface in a horizontal position and a wire 23 is attached to rear 21 by a pair of screws 25 (also shown in FIG. 2) so that the board 13 may be hung like a picture in a vertical position. Board 13 may either be a hollow or solid structure. If board 13 is a hollow structure, the front 17, back 21, and side panels are joined together by any conventional means such as glue, screws and nuts etc. (not shown).

A receptacle 27 is fixedly mounted by any suitable means (not shown) at the lower left corner of board 13. Receptable 27 includes a female edge-card connector 29 such as for example sold by Amphenol having fifty-one pairs of contacts, one pair for each state and one for use as well hereinafter be explained. A plurality of fifty lamps 31 are mounted on map 15 of board 13, one lamp 31 within the boundary of each state and preferably at the state capitol. Each lamp 31 is electrically connected by a pair of wires 33 to one of the first fifty pairs of contacts in the female edge-card connector 29. For simplicity, only two such pairs of wires 33 are shown in the drawing (In FIG. 1). A battery holder 35 adapted to hold a conventional battery 37 such as used in a flashlight is also mounted on board 13. The battery 37 is electrically connected to the female edge-card connector 29 in receptacle 27 by a pair of wires 39.

Device 11 further includes a plurality of cartridges 41-1 to 41-50, one for each state. For simplicity only cartridges 41-1 and 41-50 are illustrated in FIG. 1. The cartridges 41 are generally box-like in shape and are preferably made of translucent material. Each cartridge 41 includes a male edge-card connector 43 having one set of contacts for engaging one of the fifty pairs of contacts in the female edge-card connector 29 in receptable 27 and another set of contacts for engaging the fifty-first pair of contacts. The top surface 42 of the cartridge 41 includes printed matter such as the name, population area and capitol of the particular state that the male edge-card connector 43 will electrically couple to the female edge-card connector 29.

Figure 4:
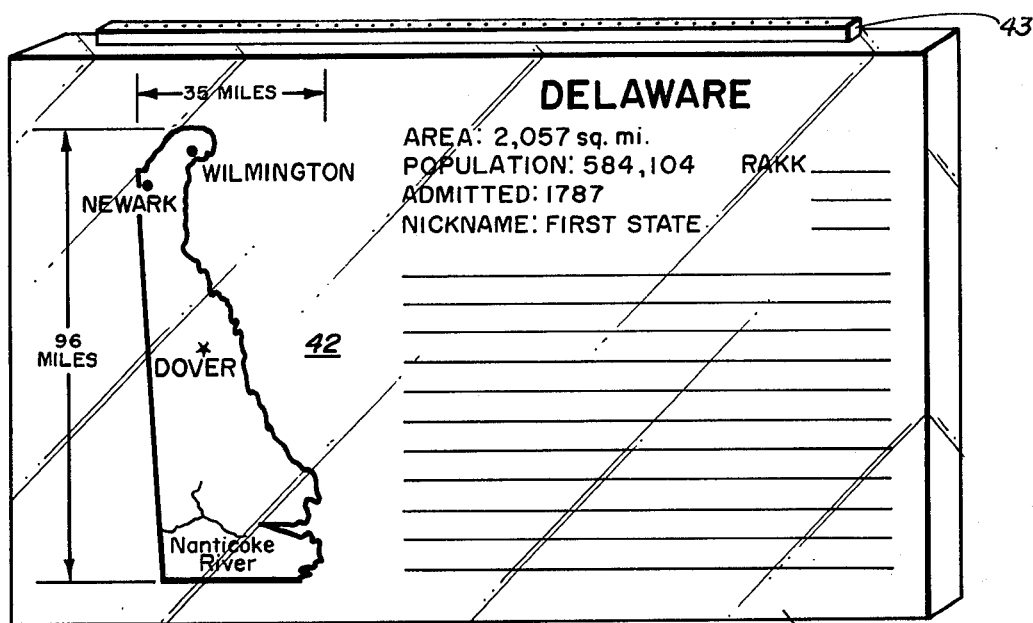
FIG. 4 is an enlarged perspective view of one of the cartridges shown in FIG. 1.

An enlarged view of cartridge 41-1 is shown in FIG. 4.

In using the device 1, the cartridge 41 for a desired state is inserted into receptacle 27 so that its set of contacts touches the appropriate set of contacts in the female edge card connector 29 causing the lamp at the corresponding state on map 15 to light.

Figure 3:
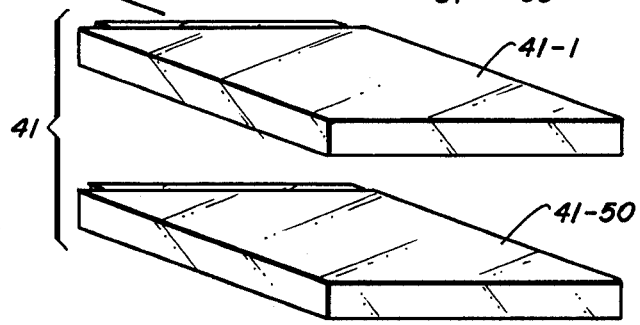
FIG. 3 is a simplified circuit diagram showing the electrical circuit arrangement in the board for connection to one lamp.
Figure 3:
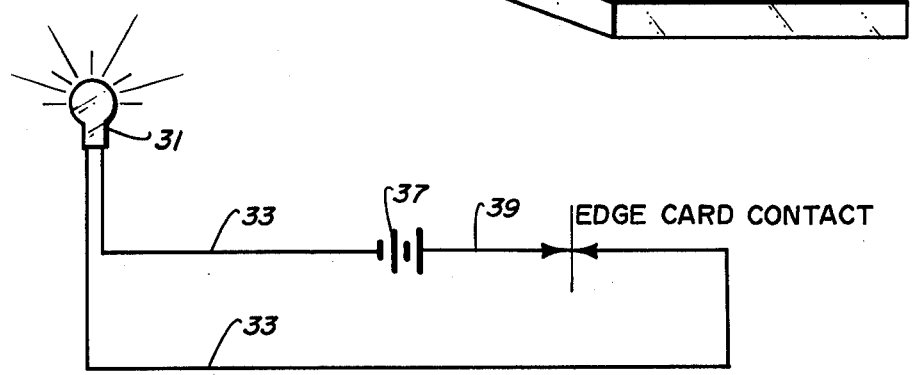

The electrical circuit for coupling a lamp 31 to the battery 37 when the female edge-card connector 29 mates with one of the male edge-card connectors 43 is illustrated in FIG. 3.

Figure 5:
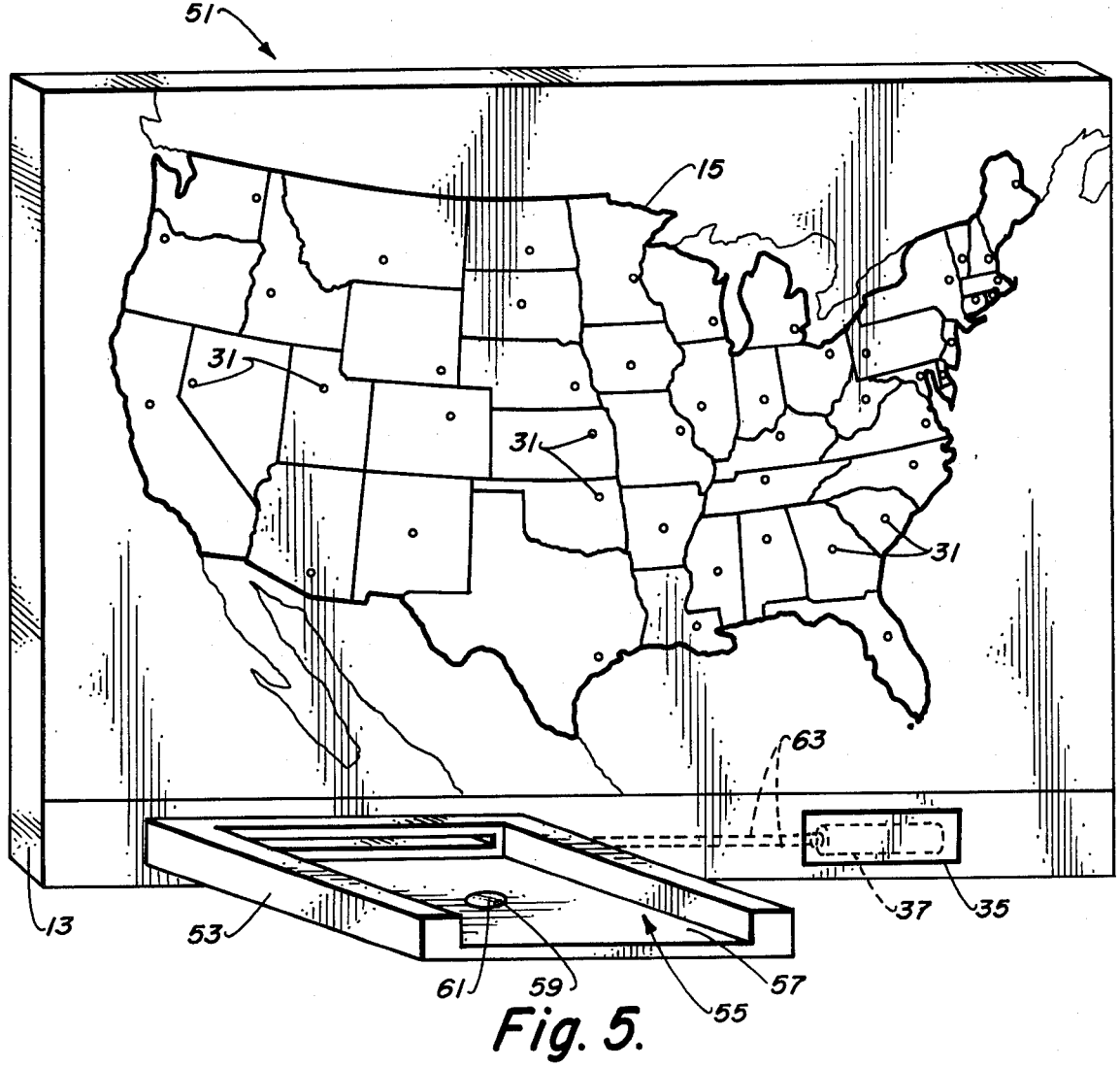
FIG. 5 is a perspective view of an alternate version of the board shown in FIG. 1.

Referring now to FIG. 5 there is illustrated another embodiment of the board identified by reference numeral 51. In this embodiment the receptacle 53 containing the female edge-card connector (not shown) projects forwardly of front surface of board 51 and includes a recessed area 55 having a bottom surface 57. Bottom surface 57 has a hole 59 in which is mounted a lamp 61 which is connected by a wire 63 to one terminal of battery 37. Lamp 61 is also connected to the fifty-first set of contacts in the female edge-card connector such that when a cartridge is inserted therein lamp 61 will also be illuminated so that the printed matter on the top surface is easily readable.

Figure 6:
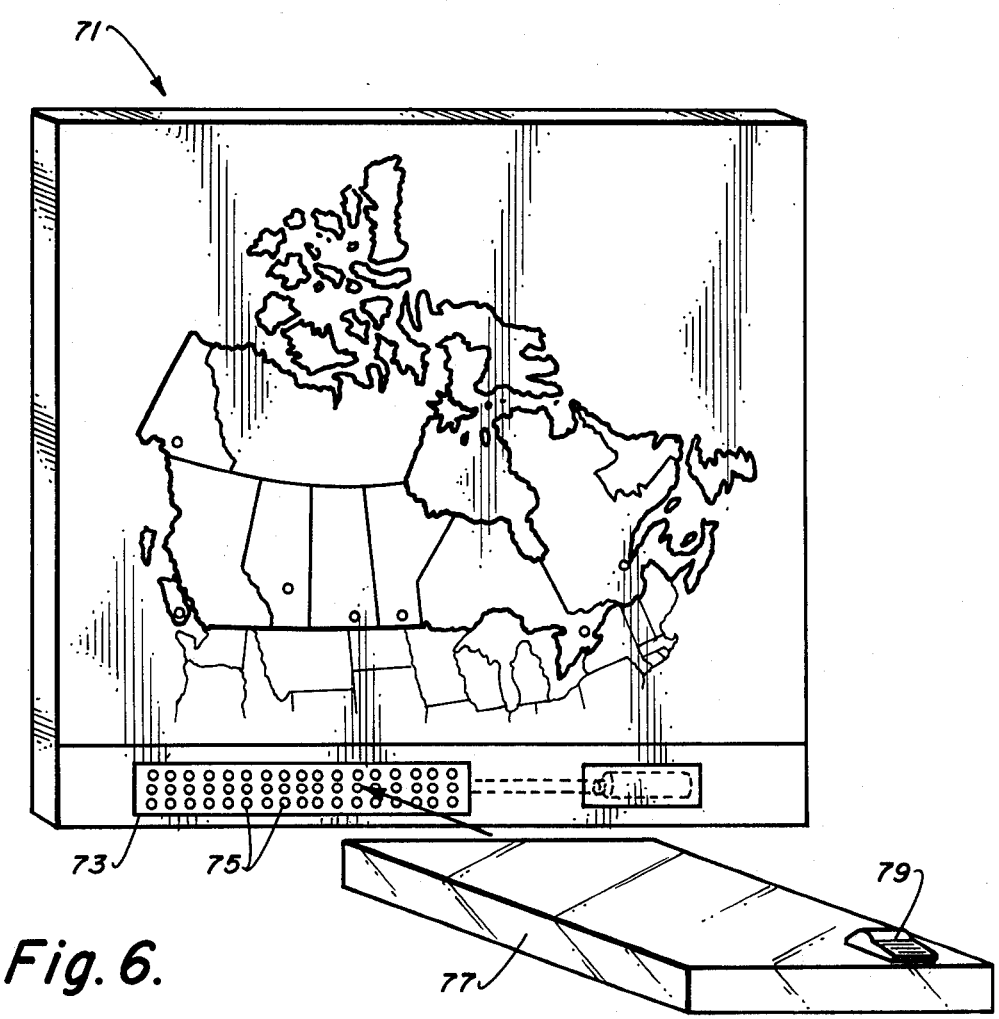
FIG. 6 is a perspective view of a portion of another embodiment of the invention.

Referring now to FIG. 6 there is illustrated another embodiment of the invention identified generally by reference numeral 71. In this embodiment, instead of a female edge-card connector, the receptacle 73 includes a row of fifty switches 75, such as microwsitches, having an off position and an on position, the on position being when a contact in the switch is depressed. The cartridges 77, only one of which is shown in FIG. 6, each include a button 79 for engaging one of the microswitches 75 and placing the microswitches 75 in an on position. In each cartridge 77, the button 79 is located to close a different microswitch corresponding to the particular state whose lamp is to be illuminated. Here the political area of the map is Canada and the subareas or states are provinces.

The foregoing description is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

Thus instead of the map being of the United States, it could feature the countries of any large political area having a plurality of subareas. Typical examples include Europe and its countries, or Africa and its countries.

What is claimed is:

1. An educational aid comprising:
   a. a board having a front surface,
   b. a map of a political area imprinted on the front surface,
   c. a separate lamp mounted on the top surface within the bounds of each subarea,
   d. a battery,
   e. a receptable mounted on the board and having a different set of contacts connected to each lamp and connecting means for connecting to the battery, and
   f. a plurality of cartridges, one for each subarea, adapted to be inserted into the receptable one at a time, each cartridge connecting one of said lamps to said battery when inserted into said receptacle.

2. The invention of claim 1 and wherein the receptacle includes a female edge-card connector and each cartridge includes a male edge-card connector.

3. The invention of claim 2 and wherein the cartridges each include printed matter pertinent to their particular state.

4. The invention of claim 3 and further including means for illuminating a cartridge when it is inserted into the receptacle.

5. The invention of claim 1 and wherein the receptacle includes a plurality of switches, one connected to the lamp at each state and the cartridges each include a button for closing one of the switches.

6. In the educational aid of claim 1 wherein the map is of the United States and the subareas are states.

7. In the aid of claim 1 wherein the political area is Europe and the subareas are countries.

* * * * *